United States Patent [19]

Perry

[11] Patent Number: 5,117,574
[45] Date of Patent: Jun. 2, 1992

[54] FISH LURE APPARATUS

[76] Inventor: Anthony W. Perry, 1 Sandwich Rd., Plymouth, Mass. 02360

[21] Appl. No.: 693,151

[22] Filed: Apr. 29, 1991

[51] Int. Cl.$^5$ .............................................. A01K 85/00
[52] U.S. Cl. .................................. 43/42.36; 43/42.06; 43/42.24; 43/42.28
[58] Field of Search ................ 43/42.06, 42.08, 42.24, 43/42.28, 42.35, 42.36, 42.41, 42.11

[56] References Cited

U.S. PATENT DOCUMENTS

| | | | |
|---|---|---|---|
| 1,611,644 | 12/1926 | Johnson | 43/42.06 |
| 2,850,834 | 9/1958 | Parrish | 43/42.11 |
| 3,226,874 | 1/1966 | Boyd | 43/42.06 |
| 3,429,066 | 2/1969 | McClellan | 43/42.24 |
| 4,841,665 | 6/1989 | McGahee | 43/42.24 |

FOREIGN PATENT DOCUMENTS 1441620  5/1966  France ............................... 43/42.28

Primary Examiner—Richard K. Seidel
Assistant Examiner—Patty E. Hong
Attorney, Agent, or Firm—Leon Gilden

[57] ABSTRACT

A fishing lure is set forth as a tube organization that mimics movement and swimming of an eel as it is supported from a moving boat in a trolling procedure. The organization is defined by at least a plurality of tubes that are secured together by a swivel to effect a twisting to mimic motion of an eel in swimming. Swivel connections are utilized for securement of fishing line and mounted between various components of the organization in use.

4 Claims, 3 Drawing Sheets

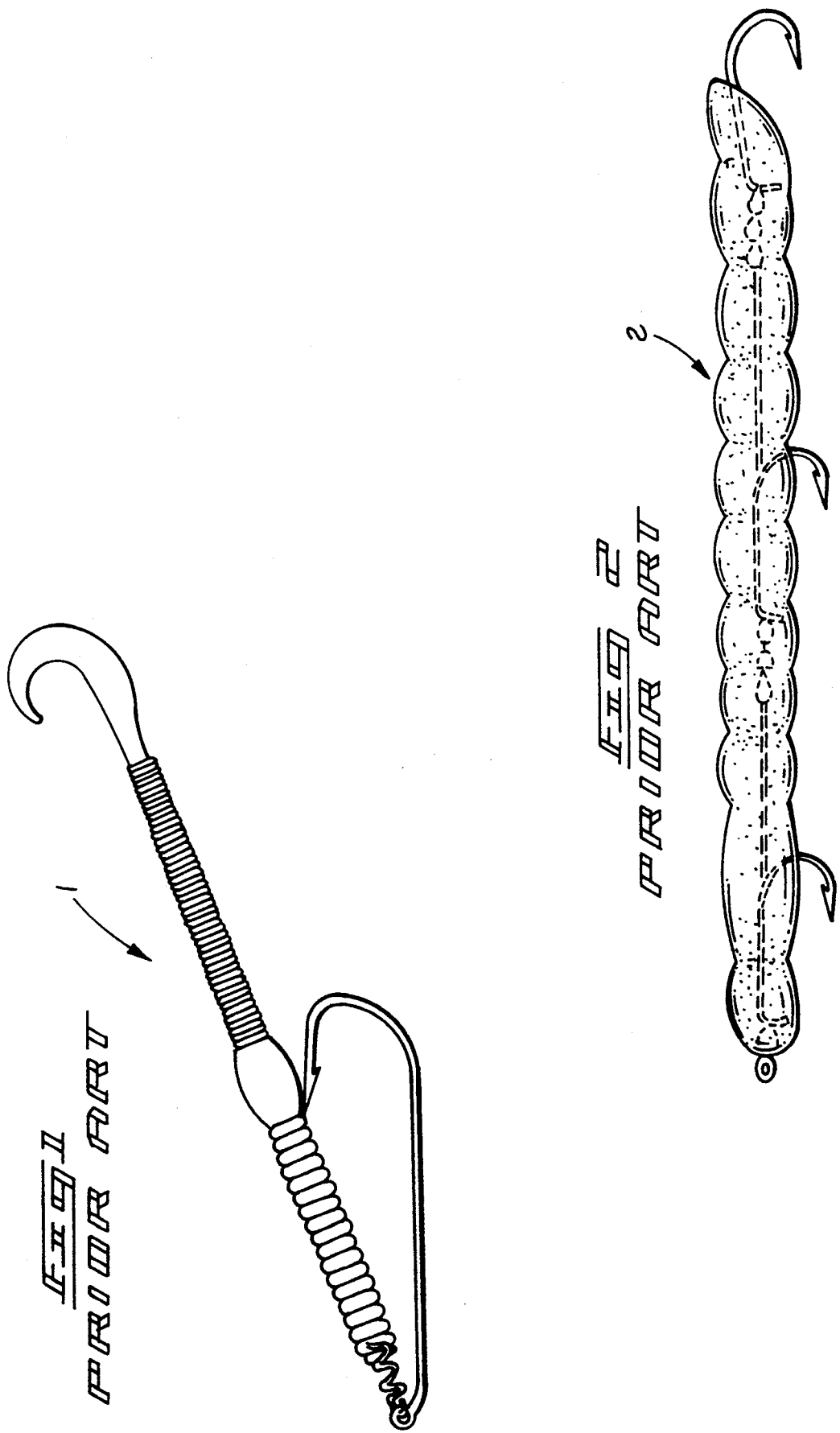

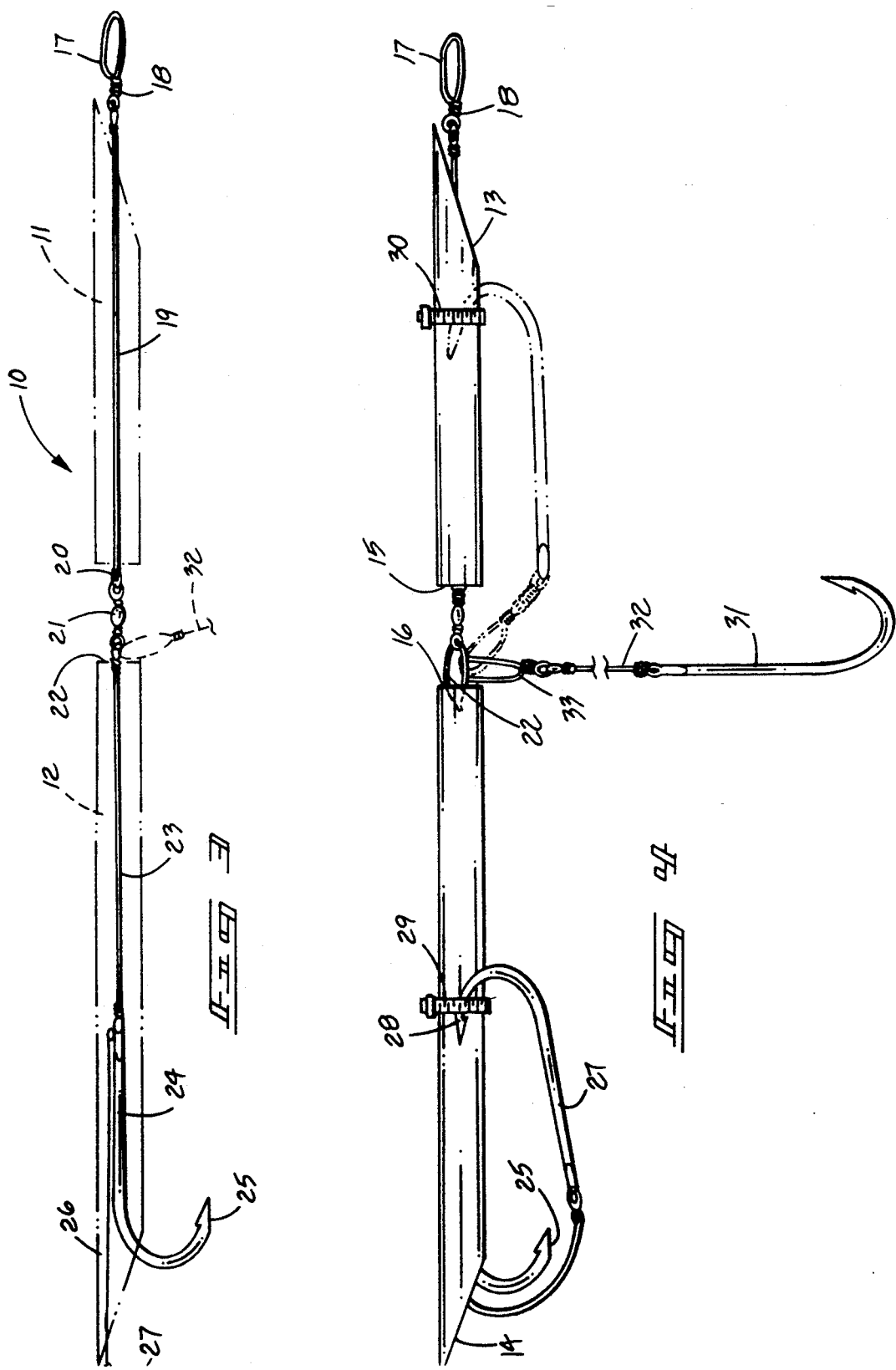

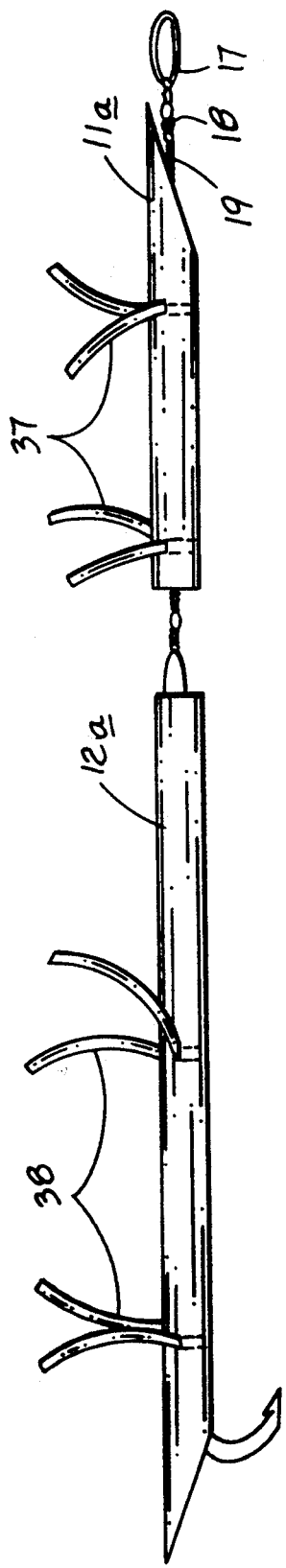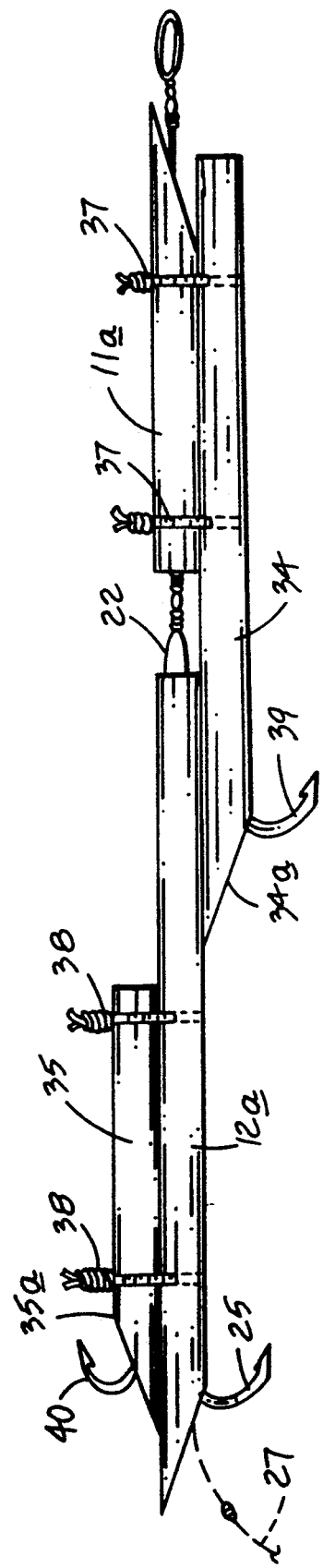

FISH LURE APPARATUS

BACKGROUND OF THE INVENTION

1. Field of the Invention

The field of invention relates to fishing lure apparatus, and more particularly pertains to a new and improved fish lure apparatus wherein the same mimics an eel as bait for use in fishing, such as utilized in bass fishing and bluefish and the like.

2. Description of the Prior Art

Various lure apparatus has been utilized in the prior art for simulation of various bait in a fishing procedure. Such prior art is exemplified in U.S. Pat. No. 4,841,665 to McGahee wherein a helical wire coil includes a means of securing one end of the helix to a fish hook by snap deformation of the wire.

U.S. Pat. No. 3,429,066 sets forth a plastic worm-like fishing lure with hooks projecting therefrom.

U.S. Pat. No. 3,724,116 to Lindner, et al. sets forth a fish hook simulation, with a worm-like simulation member formed thereabout.

U.S. Pat. No. 4,244,133 to Martinek sets forth a barbed fishing lure with a coil spring terminating in a fish hook mounted thereto for use in bass fishing.

As such, it may be appreciated that there continues to be a need for a new and improved fish lure apparatus as set forth by the instant invention which addresses both the problems of ease of use as well as effectiveness in construction in providing a fishing lure for simulation of a swimming eel and in this respect, the present invention substantially fulfills this need.

SUMMARY OF THE INVENTION

In view of the foregoing disadvantages inherent in the known types of fishing lure apparatus now present in the prior art, the present invention provides a fish lure apparatus wherein the same utilizes a plurality of hook members mounted to an elongate flexible tube-like member for simulation of an eel for use in bass fishing. As such, the general purpose of the present invention, which will be described subsequently in greater detail, is to provide a new and improved fish lure apparatus which has all the advantages of the prior art fish lure apparatus and none of the disadvantages.

To attain this, the present invention provides a fishing lure set forth as a tube organization that mimics movement and swimming of an eel as it is supported from a moving boat in a trolling procedure. The organization is defined by at least a plurality of tubes that are secured together by a swivel to effect a twisting to mimic motion of an eel in swimming. Swivel connections are utilized for securement of fishing line and mounted between various components of the organization in use.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fish lure apparatus which has all the advantages of the prior art fish lure apparatus and none of the disadvantages.

It is another object of the present invention to provide a new and improved fish lure apparatus which may be easily and efficiently manufactured and marketed.

It is a further object of the present invention to provide a new and improved fish lure apparatus which is of a durable and reliable construction.

An even further object of the present invention is to provide a new and improved fish lure apparatus which is susceptible of a low cost of manufacture with regard to both materials and labor, and which accordingly is then susceptible of low prices of sale to the consuming public, thereby making such fish lure apparatus economically available to the buying public.

Still yet another object of the present invention is to provide a new and improved fish lure apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic side view of a prior art fish lure apparatus.

FIG. 2 is an orthographic side view of a further example of a prior art fish lure apparatus.

FIG. 3 is an orthographic side view, partially in phantom, of the instant invention.

FIG. 4 is an orthographic side view of the instant invention in an assembled configuration.

FIG. 5 is an orthographic side view of a modified aspect of the instant invention.

FIG. 6 is an orthographic side view of the modified aspect of the instant invention and associated attachments mounted thereto.

DESCRIPTION OF THE PREFERRED EMBODIMENT

With reference now to the drawings, and in particular to FIGS. 1 to 6 thereof, a new and improved fish lure apparatus embodying the principles and concepts of the present invention and generally designated by the reference numberal 10 will be described.

FIG. 1 is an illustration of a prior art fish lure apparatus 1, as exemplified in U.S. Pat. No. 4,841,665, wherein a helical coil wire mounts a fish hook at one end and an artificial lure at the other end thereof.

FIG. 2 illustrates a further prior art fish lure apparatus 2, as set forth in U.S. Pat. No. 3,429,066, wherein a worm-like member has imbedded therewithin a plurality of hooks extending therefrom.

More specifically, the fish lure apparatus 10 of the instant invention essentially comprises a first resilient tube 11 mounted hingedly to a second resilient tube 12. The first resilient tube 11 includes a first tube rear beveled end 13, and a first tube forward end 15 that is oriented orthogonally relative to an axis of the first tube. The second tube 12 includes a second tube forward beveled end 14 and a second tube rear end coaxial to an axis of the second tube, wherein the forward ends 15 and rear ends 16 are spaced apart to permit access to various coupling members to include a second swivel connection 21 and a snap connection 22, to be discussed in more detail below. The first tube 11 is of a first predetermined length, and the second tube 12 is defined by a second predetermined length. A first loop 17 extends exteriorly of the first tube rear beveled end 13, with a first swivel connection 18 mounted thereto. A first flexible line member 19 is mounted to the first swivel connection 18 and is directed through the first tube 11 of a length greater than the first predetermined length terminating in a second loop 20. The second loop 20 is mounted to a second swivel connection 21, and in turn mounted to the snap connection 22. The snap connection 22 has secured thereto a second flexible line member 23 and a fourth flexible line 32. The second flexible line member 23 extends a distance less than the second predetermined length, through the second resilient tube 12, and mounts a second line "J" shaped hook member 24, with the second "J" shaped hook member barb end 25 only extending from the second tube forward beveled end 14 for concealment of the second hook member 24, with a shank of the second hook member 24 contained within the second tube. A third flexible line 26 is mounted to the forward terminal end of the second flexible line member 23, and includes a third "J" shaped hook member 27 mounted thereto. The third "J" shaped hook member 27 includes a third "J" shaped hook member barb end 28. A first hook member 31 is mounted to a fourth flexible line 32 that in turn, as noted above, mounted to the snap connection 22 accessible by the spacing of the first resilient tube 11 relative to the second resilient tube 12. A fourth flexible line loop connector 33 mounts the fourth flexible line 32 to the snap connector 22.

In FIG. 4, a first slider ring 30 is mounted about the first resilient tube 11, with a second slider ring 29 mounted about the second resilient tube, with the first slider ring 30 mounting the first hook member 31 thereto in contiguous communication with the first tube, while the second slider ring 29 mounts the third "J" shaped hook member 27 in relative securement to the second resilient tube 12 for transport of the organization in maintaining the barbed hooks in general proximity relative to the tube structure minimizing tangling and engagement of the hooks relative to an individual, other fishing tackle, and the like.

The FIGS. 5 and 6 illustrate a modification of the invention, wherein the use of the first modified resilient tube 11a and a second modified resilient tube 12a each include a respective first and second plurality of strap fasteners 37 and 38. The strap fasteners 37 and 38 permit securement of a respective third and fourth flexible tube 34 and 35 thereto. The third resilient tube 34 includes a third resilient tube beveled forward end 34a mounting a fourth hook 39 extending therefrom, wherein the fourth flexible tube 35 mounts a fifth hook 40 extending from the forward beveled end 35a. This permits additional hook members to improve opportunity for engaging and hooking of a fish while maintaining a general elongate figure of an eel structure.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fish lure apparatus, comprising in combination,
    a first resilient tube spaced from a second resilient tube, the first resilient tube including a first tube rear beveled end oriented at an oblique angle relative to the first axis of the first tube, and the first tube including a first tube forward end oriented generally orthogonally relative to the first axis, and
    the second tube including a second tube rear end, with the second tube defined by a second tube axis, the second tube axis orthogonally oriented relative to the second tube rear end, and the second tube including a second tube forward beveled end oriented at an oblique angle relative to the second tube axis, and
    a first flexible line member directed through the first tube extends from the first tube rear beveled end and is secured to a first loop, the first flexible line member extending through the first tube from the first loop and terminating in a second loop spaced exteriorly of the first tube forward end, and
    the second loop including a snap connection mounted thereto, the snap connection including a second flexible line mounted thereto, the second flexible line extending from the snap connection through the second tube and terminating in a second line hook loop connector within the second tube, with the second line hook mounted to the second line hook loop connector, the second line hook including a shank contained within the second tube and the second line hook member including a second hook member barb end extending laterally from the second tube projecting from the second tube forward beveled end, and including a third flexible line mounted to the second hook loop, and the third line extending exteriorly of the second tube from the second tube forward beveled end, with a third line hook member mounted to the third flexible line, the third hook member positioned exteriorly of the second flexible tube, and wherein a fourth flexible line is mounted to the snap connection, and the fourth flexible line extends from the snap connection to a fourth line loop, and the fourth line loop mounts a fourth line first hook member thereto, the fourth line first hook member extending exteriorly of the first tube and the second tube, and a first slider ring slidably mounted about the first tube, the first slider ring arranged for securement of the fourth line first hook, and a second slide ring slidably mounted to the second tube, the second slider ring arranged for securement of the third line hook within the second slider ring.

2. An apparatus as set forth in claim 1 wherein the snap connection includes a swivel connection mounted to the snap connection and the first flexible line member.

3. An apparatus as set forth in claim 2 wherein the first resilient tube includes a plurality of first strap fasteners imbedded within the first resilient tube, and the second resilient tube includes a plurality of second strap fasteners imbedded within the second resilient tube, and the first strap fasteners secure a third flexible tube in contiguous communication with the first resilient tube, and the second strap fasteners secure a fourth flexible tube in contiguous communication with the second resilient tube, and the third flexible tube includes a fourth hook extending from the third flexible tube, and the fourth flexible tube includes a fifth hook extending from the fourth flexible tube.

4. An apparatus as set forth in claim 3 wherein the third flexible tube includes a third flexible tube forward beveled end, and the fourth hook extends laterally of the third flexible tube forward beveled end, and the fourth line first flexible tube includes a fourth flexible tube forward beveled end, and the fifth hook extends laterally of the fourth flexible tube forward beveled end.

* * * * *